(No Model.)
W. & J. W. McDONOUGH.
ANIMAL TRAP.
No. 599,006. Patented Feb. 15, 1898.
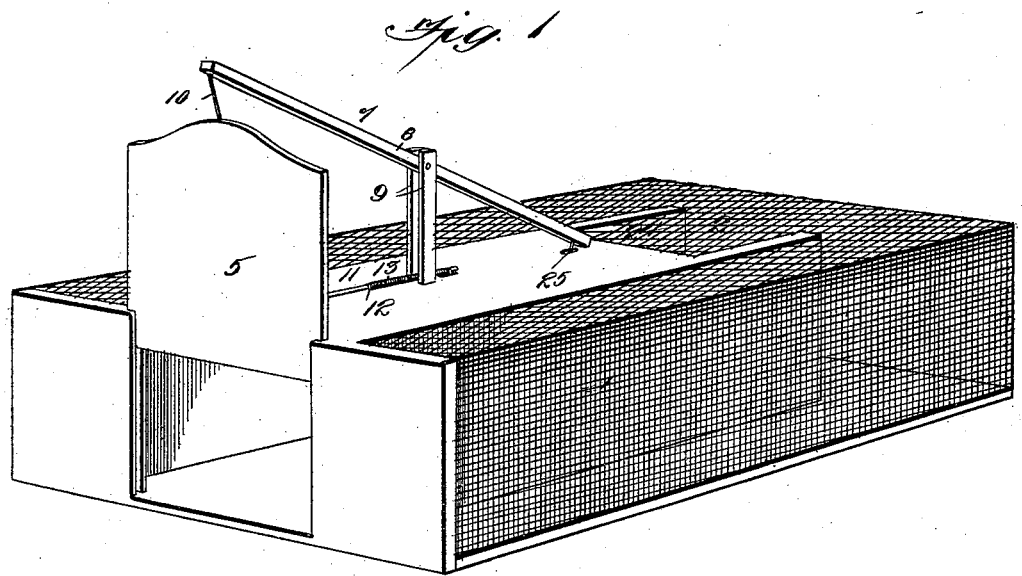
Fig. 1
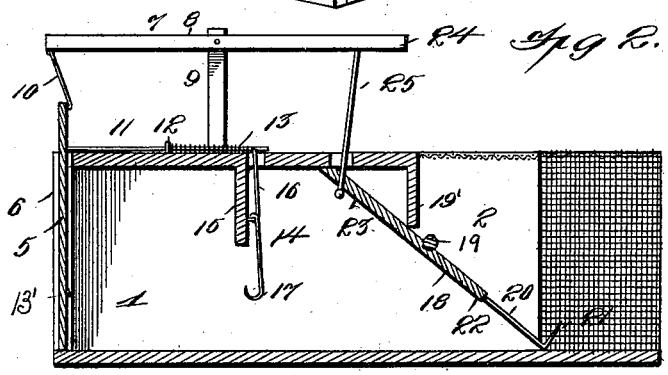
Fig. 2
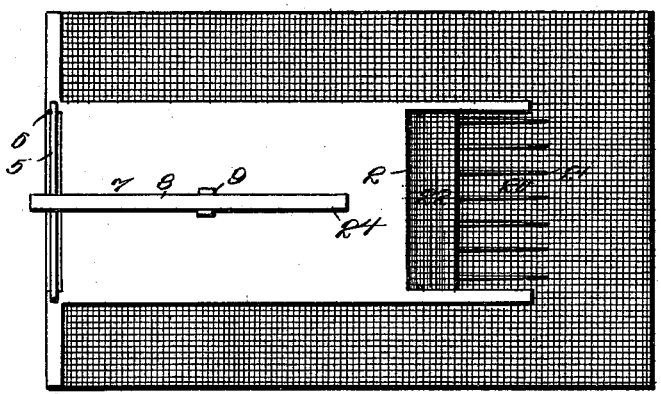
WITNESSES
INVENTORS
William McDonough
John W. McDonough
By John Hedderburn, Attorney

UNITED STATES PATENT OFFICE.

WILLIAM McDONOUGH AND JOHN W. McDONOUGH, OF PINE WOOD, TENNESSEE.

ANIMAL-TRAP.

SPECIFICATION forming part of Letters Patent No. 599,006, dated February 15, 1898.

Application filed March 15, 1897. Serial No. 627,474. (No model.)

*To all whom it may concern:*

Be it known that we, WILLIAM McDONOUGH and JOHN W. McDONOUGH, citizens of the United States, residing at Pine Wood, in the county of Hickman and State of Tennessee, have invented certain new and useful Improvements in Animal-Traps; and we do hereby declare the following to be a full, clear, and exact description of the invention, such as will enable others skilled in the art to which it appertains to make and use the same.

This invention relates to certain new and useful improvements in animal-traps, the object being to provide a simple and effective form of trap having an entrance-chamber closed by a gravity-door released by a trigger mechanism and a cage designed to receive the captured animals, guarded by a normally-closed door which opens by pressure from the animal as the latter seeks to escape into the cage and automatically sets the gravity-door in position for another capture.

To this end our invention consists in certain novel constructions, combinations, and arrangements of parts, as will be hereinafter more fully described, and specifically set forth in the appended claim.

In the accompanying drawings, Figure 1 is a perspective view of an animal-trap constructed in accordance with our invention. Fig. 2 is a central longitudinal sectional view of the same. Fig. 3 is a top or plan view of the trap.

Like numerals designate like parts throughout the several views.

Referring to the drawings, the numeral 1 designates a suitable inclosing box or case having a portion of one side 2 at the rear end of the case open and covered with wire screen or netting 3 to permit entrance of light thereto. The front portion of the inclosing box or case is designed to receive and hold the trap mechanism, while the rear portion from the open side referred to is intended to serve as a cage to receive the captured animal. This inclosing box or case rests upon a base-board 4 and is relatively narrower and shorter than said board, so that a cage $4^a$ is formed around the sides and at the rear end of the trap-body to receive the captured animal. This case is closed by wire-netting $4^b$, which extends around the base, as shown.

The trap proper occupies the front part of the said box or case and comprises a body or receptacle open at the front thereof and provided with a gravity-operating door 5, movable in guides 6. A tilting lever 7 is provided with a fixed cross-bar 8 at or about the center thereof, which is pivoted to two standards 9, extending up from the top wall of the trap-receptacle. The front end of this tilting lever is connected, by means of a jointed rod 10, to the upper end of the gravity-door 5. The trigger mechanism comprises a bolt 11, movable in guides 12 within the case and surrounded by a spiral spring 13, which normally serves to project the bolt or throw it into locking position to engage a lug 13' on the door. The trigger 14 is attached to a transverse plate or bar 15, and the upper end 16 of this trigger is connected to the said bolt, and the lower end 17 thereof is formed with a hook adapted to receive and hold bait. A balanced door 18 is positioned at the rear of the said trigger mechanism and is secured about centrally of its length to a shaft 19, journaled in the side walls of the case adjacent downward-projecting stop-bar 19', and the lower end of this balanced door is provided with a series of spaced projecting rods 20, having sharpened spike ends 21, which project upwardly and fit between rearwardly-projecting spikes 21' on the base or floor of the trap. The door proper, 18, is pivoted centrally of its length, so that it is normally balanced; but the weight of the said spike-rods 21 normally serves as a counterbalancing-weight to hold the innermost end 22 downward to close the opening to the cage-receptacle 1. As the inner end of the trap-body proper opens into the cage-receptacle 1, the said balanced door guards the entrance thereto, and as the spike-rods 20 21' are spaced apart the light-rays from the open side of the cages are permitted to enter into the trap-body proper. The upper end 23 of the balanced door is connected to the rear end 24 of the tilting lever 7 by means of a rod or wire 25, extending through the top wall of the trap-body.

By this construction it will be seen that when the animal enters the front door of the trap-body and nibbles at the bait on the trigger 14 the bolt 11, which normally projects below the lower end of the gravity-door 5 and holds the same open, is retracted and the said door drops and closes the front opening by its own gravity. The tilting lever 7 assumes a horizontal position when the door 5 is down and draws upward the upper end of the balanced door, whereby the lower end of the said door, carrying the spaced spike-rods, is forced downward into contact with the floor of the trap-body. The animal, which is caged, cannot escape through the front door of the trap, and, seeing the light from the spaced spike-bars of the balanced door, naturally passes that way in an endeavor to escape, and the pressure of the body of the animal against the said spike-rods lifts upward the said end of the balanced door and permits the animal to pass from the trap-body proper into the cage-inclosure 1, where it is securely confined. This forcing up of the end of the balanced door carrying the spiked rods causes the rear end 24 of the tilting lever 7 to be drawn downward, whereby the gravity-door 5 of the trap is drawn upward and opened, and when the lower end thereof passes the trigger-bolt the latter is projected by its spring to engage the lug 13' on the door and holds the said door open automatically. It will thus be seen that the passage of the animal from the trap-body proper to the cage-receptacle in the rear automatically sets the trap for the capture of another animal.

A trap thus constructed is simple, durable, and efficient in operation and it may be manufactured at a very small cost.

Having thus described our invention, what we claim as new, and desire to secure by Letters Patent, is—

In an animal-trap, the combination of a base-board having a front wall provided with a doorway, a trap-body resting on the said base and relatively narrower and shorter than the same, said trap-body having an opening at the rear the top of which is closed by wire-netting, wire-netting extending around the sides and top of the base-body and forming an outer inclosing case to receive the captured animal, a door sliding in said guide in the front wall, a spring-actuated bolt to hold the door closed, a trigger pivoted to a transverse bar projecting from the top wall of the case and connected with said bolt to release the same, a normally-inclined tilting door pivoted in said trap-body and provided at the inner end thereof with spaced spike-rods projecting through the said opening in the rear of the trap, a stop-bar projecting downward from the top wall of the case at the rear opening thereof to prevent an animal from climbing back on the pivoted door and tilting the same forward, and a connection between the upper end of the inclined pivoted door and the front sliding door, whereby when the lower end of the pivoted door is raised by an animal passing therethrough, the front door will be opened and automatically engaged by the bolt, substantially as described.

In testimony whereof we have signed this specification in the presence of two subscribing witnesses.

WILLIAM McDONOUGH.
JOHN W. McDONOUGH.

Witnesses:
R. S. KNOTTS,
ELBERT EASLEY.